May 12, 1931. W. L. WARD 1,804,579
MANUFACTURE OF NUT BLANKS
Filed March 15, 1927 6 Sheets-Sheet 1
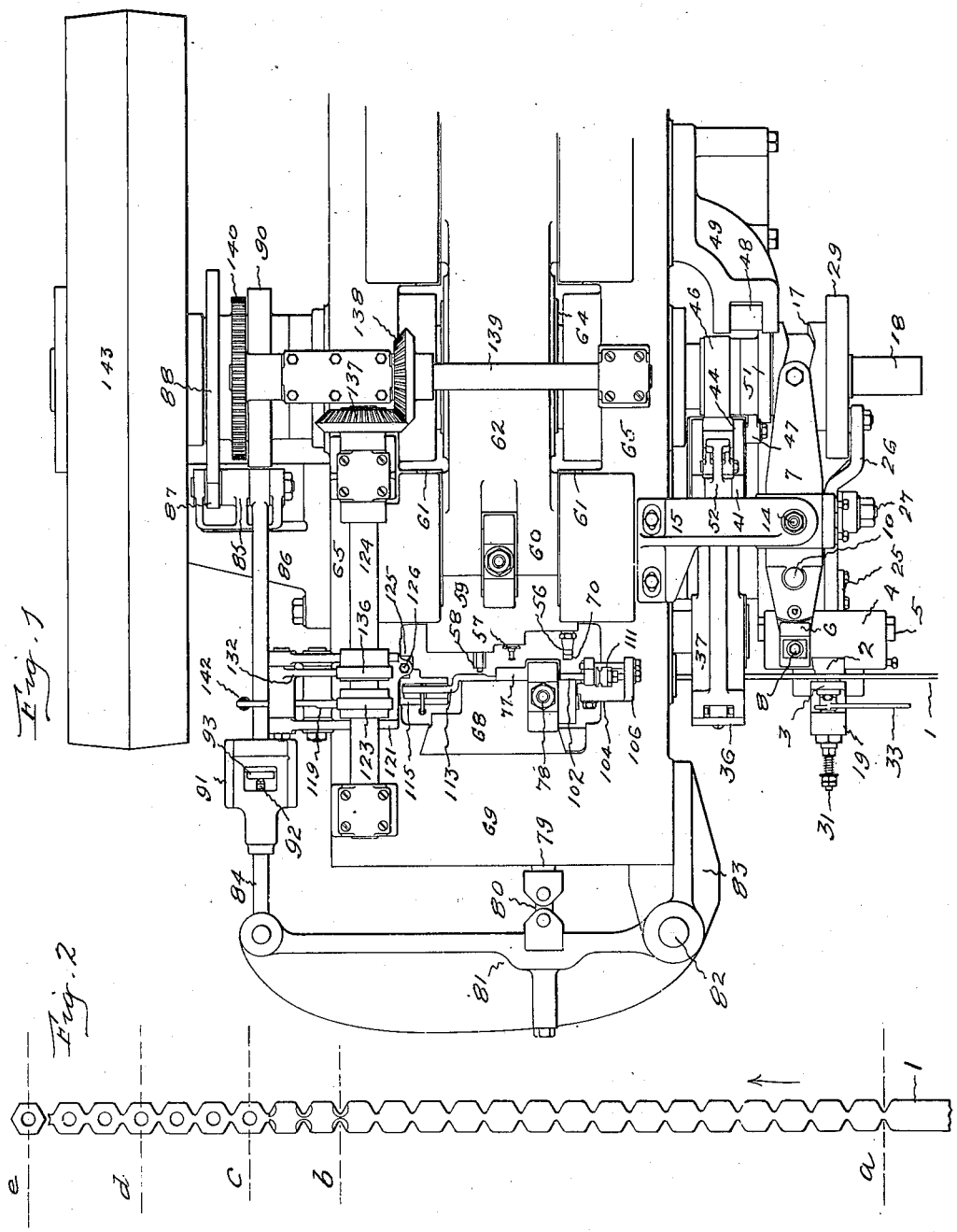
INVENTOR
William L. Ward by
Harry R. Williams
atty.

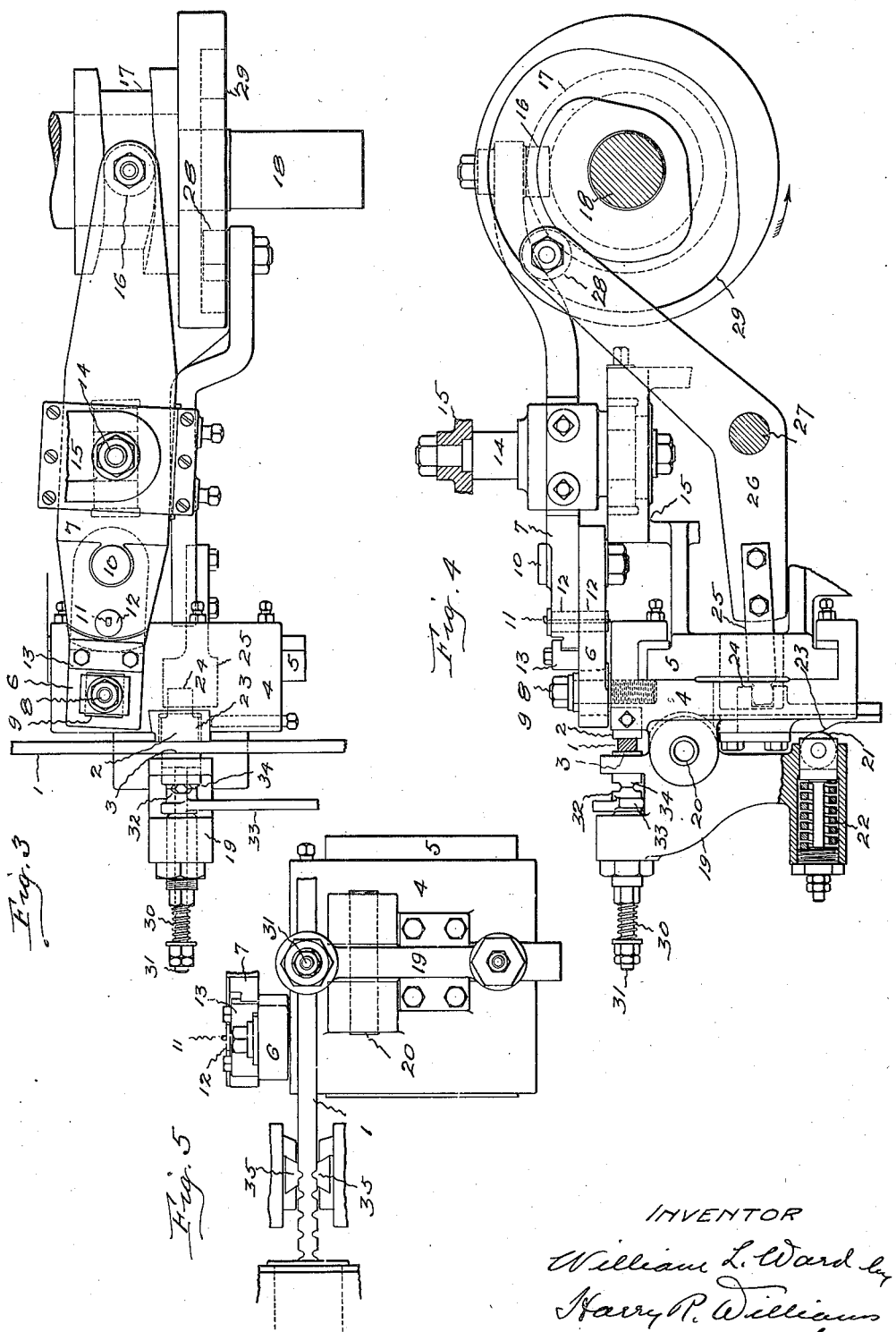

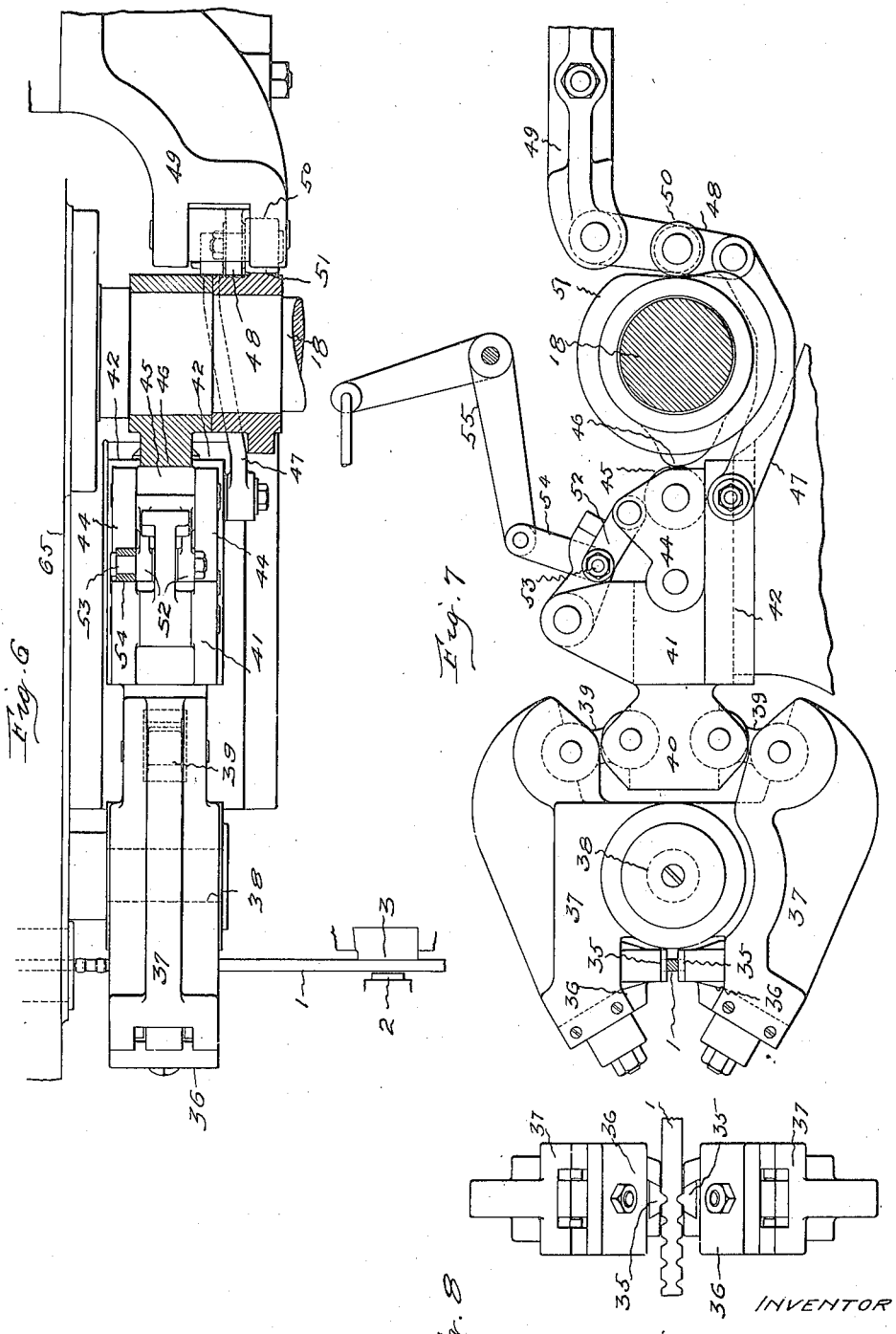

May 12, 1931.  W. L. WARD  1,804,579
MANUFACTURE OF NUT BLANKS
Filed March 15, 1927   6 Sheets-Sheet 4
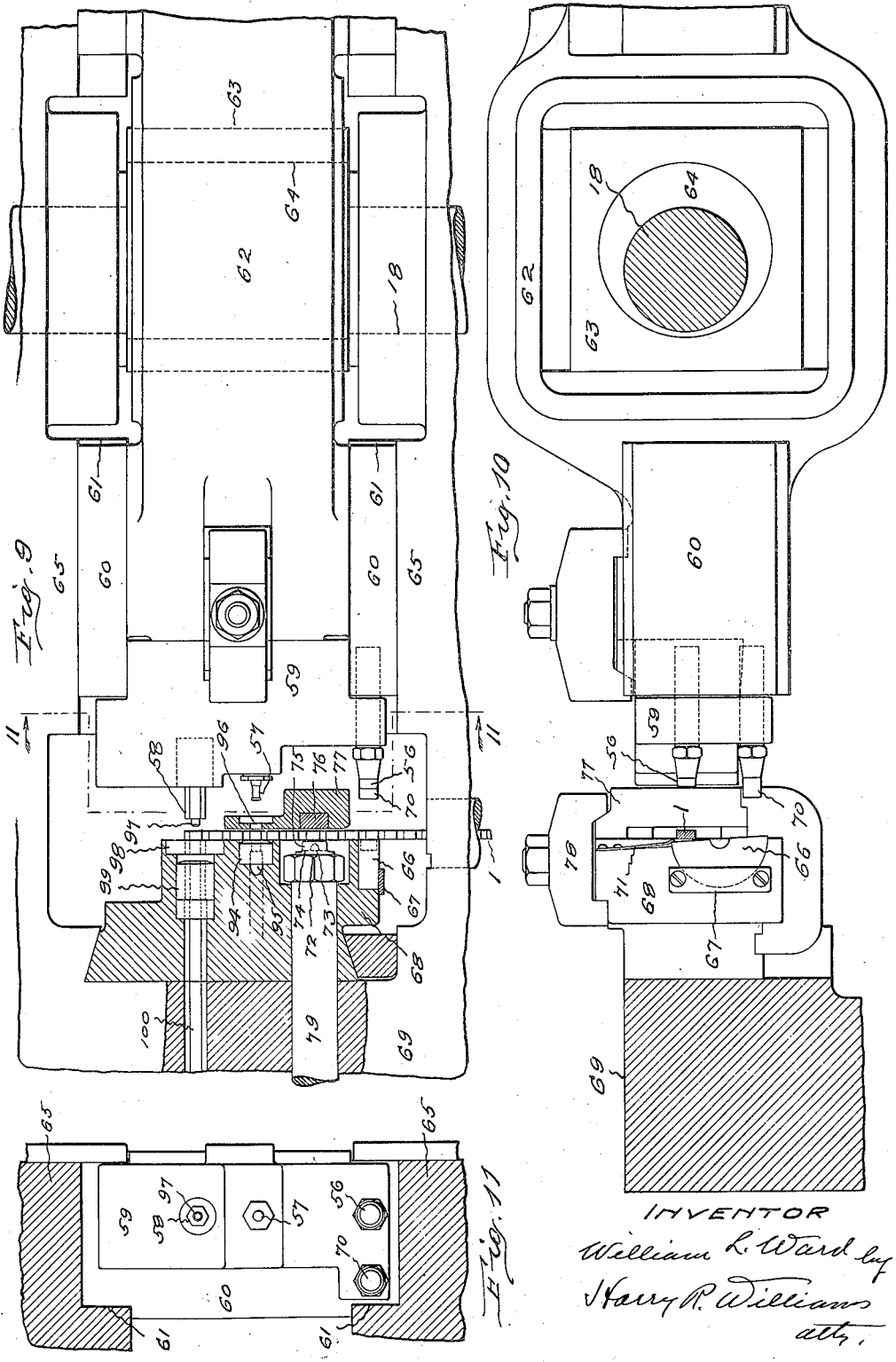
INVENTOR
William L. Ward by
Harry R. Williams
atty.

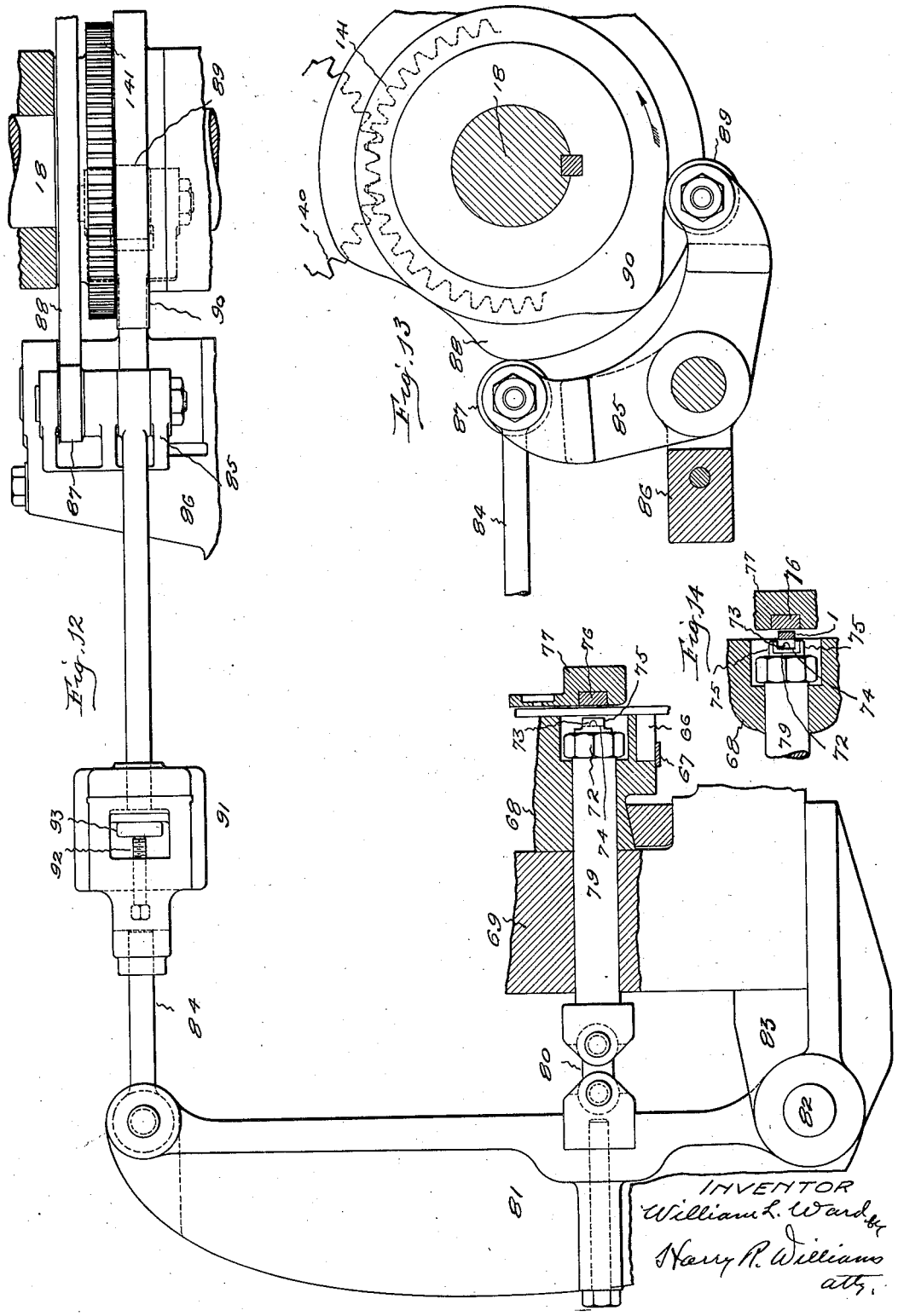

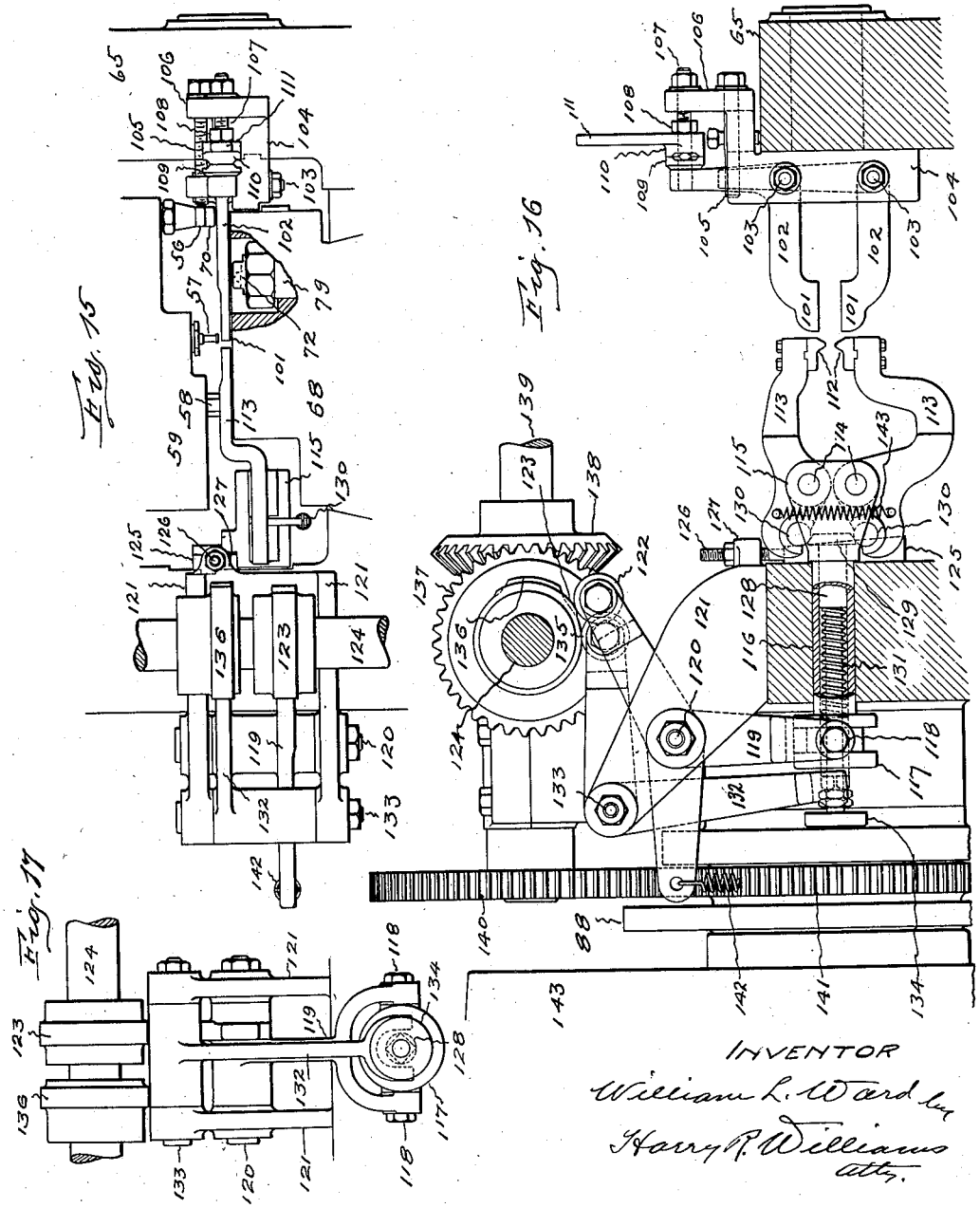

Patented May 12, 1931

1,804,579

UNITED STATES PATENT OFFICE

WILLIAM L. WARD, OF PORT CHESTER, NEW YORK, ASSIGNOR TO RUSSELL, BURDSALL & WARD BOLT & NUT COMPANY, OF PORT CHESTER, NEW YORK, A CORPORATION OF NEW YORK

MANUFACTURE OF NUT BLANKS

Application filed March 15, 1927. Serial No. 175,468.

This invention relates to a cold method of and means for manufacturing hexagonal nut blanks.

The object of the invention is to provide a method of and means for producing such articles rapidly and continuously from a minimum amount of stock and with a very small percentage of waste, thereby reducing the cost of the same.

In accomplishing this result a rectangular bar of cold stock of indefinite length and suitable width and thickness to produce blanks of the required size is intermittently fed and so operated upon in successive steps that the blanks are approximately shaped and the perforations substantially made by pressure exerted in such a manner that the bar is elongated, thus eliminating to a large extent the cost and maintenance of cutting tools and the waste of sheared stock.

The edges of the bar, as it is fed, are at intervals serrated by wedge shaped tools, the angles of which approximate the angular faces of two adjoining blanks, which action is so effected that the metal is spread apart at the correct intervals to produce the adjacent angular faces of two blanks. This elongates the bar and such metal if any as is forced outward by the pressure of the serrating tools may be subsequently flattened by the action of tools forced against the faces of the bar in such manner as to also elongate the bar. The bar with its edges serrated and its faces flattened is subjected to the action of a punch which from one side of the bar sinks a hole partly through the center of each blank section of the bar as it is presented, without removing any metal. This further elongates the bar and condenses the metal about the hole. Subsequently a piercing punch is advanced from the opposite side of the bar to complete the formation of the hole in the blank, the action of the piercing punch being followed by a hexagonal punch which severs the blank thus produced from the bar and forces it through a trimming die.

These operations are performed on the bar at different localities as it is advanced, at such times that none interferes with the elongation of the bar resulting from the action of the other, in other words, the actions of the feed mechanism and tools are so co-related that the bar is free to elongate whenever subjected to the action of any of the tools.

In the accompanying drawings Fig. 1 is a plan view of a machine which embodies the invention. Fig. 2 shows on a slightly larger scale a bar of stock as it appears when passing through the machine and being operated upon by the several mechanisms. Fig. 3 is a plan of the feed mechanism. Fig. 4 shows a side elevation of the feed mechanism. Fig. 5 shows a front elevation of the feed mechanism. Fig. 6 shows a plan, with parts broken away, of the serrating mechanism. Fig. 7 is a side elevation of the serrating mechanism. Fig. 8 is a front elevation of the serrating mechanism. Fig. 9 is a plan showing the slide which carries the flattening punch, perforating punch and severing punch, and a section of the bed in which are mounted the flattening anvil, sinking punch and trimming die. Fig. 10 is a side elevation of the punch slide and the eccentric by which it is reciprocated. Fig. 11 is a section on the dotted line 11—11 on Fig. 9. Fig. 12 is a plan view showing the mechanism for operating the sinking punch. Fig. 13 is a side elevation showing the sinking punch cams. Fig. 14 shows the sinking punch on a different plane from that shown in Fig. 12. Fig. 15 is a plan showing the edge guides and the locating fingers, and the mechanism opening and closing and advancing and retracting the locating fingers. Fig. 16 is a side elevation of the parts shown in Fig. 15. Fig. 17 is an end elevation of the parts shown in Fig. 15.

The feed mechanism is shown generally in Fig. 1 and in detail in Figs. 3, 4 and 5. The bar of stock 1 to be operated upon is passed into the machine from one side and is fed through intermittently by the action of jaws 2, 3 which engage with the side faces of the bar. In the machine illustrated the rear feed jaw 2 is fastened in a slide 4 that is movable horizontally on a track 5 which is attached to the side of the frame. An arm 10

6 extending from an oscillatory lever 7 is connected with this slide by a stud 8 that passes through a slot 9 in the arm and is screwed into the top of the slide. This arm is fastened to the front limb of the lever by a pivot stud 10 and also by a shear pin 11 which passes through hardened bushings 12 in the arm and lever in such manner that should interference occur which would cause undue resistance to the movement of the feed slide the pin will be cut off by the bushings, allowing a continued oscillation of the lever without danger of injuring or straining the feed mechanism. A cap 13 is fastened to the arm so as to overlie the end of the lever and prevent the separation of the parts whenever the pin is broken and the lever continues to oscillate.

The lever 7 is pivoted on an arbor 14 that is adjustably supported by brackets 15 attached to the side of the frame. On the rear end of the lever is a roller 16 that is engaged by a cam 17 on the cam shaft 18. This cam is shaped to oscillate the lever and cause the slide to advance and return at the desired periods.

The front feed jaw 3 is held in the upper end of a rocker 19 that is pivoted to the slide 4 by an arbor 20 so that while the upper end of the rocker, bearing the front jaw, may be swung toward and from the rear jaw it will advance and return horizontally with the slide and rear jaw. The lower end of the rocker carries a roller 21 that is pressed by a spring 22 into yielding engagement with a wedge cam 23 which has a vertical movement in the face of the slide 4. When this wedge cam is down, as illustrated in Fig. 4, the rocker is turned so that the front jaw is forced toward the rear jaw and a bar of stock will be clamped between the jaws. When the wedge cam is drawn up the grip of the jaws on the bar is released. The yielding engagement of the roller with the wedge cam, permits the jaws to accommodate themselves to slight variations in the thickness of the bar.

On the back face of the wedge cam which moves horizontally with the slide but is capable of an independent vertical movement, is a yoke 24 that is engaged by a finger 25 which is attached to the forward end of a lever 26 pivoted on a stud 27 supported by the frame. The rear end of this lever has a roller 28 that is engaged by a cam 29 on the cam shaft 18. This cam is timed to cause, through the means described, the feed jaws to open and close at the required intervals.

In order to free the front jaw 3 so that a bar of stock may be easily thrust between or withdrawn from between the jaws, a spring 30 is arranged on the stem 31 of the front jaw in such manner as to tend to pull the jaw outward, and a sleeve with a wedge surface 32 and provided with a handle 33 is arranged on the stem between a portion of the rocker and a wedge surface 34 on the jaw, as illustrated in Figs. 3, 4. When the handle is turned to one position the jaw is released and drawn forward by the spring and with the handle turned to another position the wedging surfaces of the sleeve and jaw are engaged so as to lock the jaw in operative position in the rocker.

As a result of the adjustments to which these mechanisms are capable very accurate advance and return and closing and opening movements may be ensured for the jaws at the desired times.

From the feed mechanism the bar of stock advances to the serrating mechanism which is shown generally in Fig. 1 and in detail in Figs. 6, 7 and 8. After the bar of stock is fed each step and the grip of the feed jaws is released it is serrated. This is accomplished by tools in the form of wedge shaped teeth 35 which are closed upon and forced into opposite edges of the bar, one from above and the other from below. The angles of the teeth are approximately 60° so that they will when forced into the bar expand the metal and elongate the bar and produce the adjacent angular faces of two hex nut blanks. The serrating teeth are held by clamps 36 in the front ends of levers 37 which are pivoted on a stud 38 that projects from the side of the frame. The rear ends of these levers are forked and are connected by toggle links 39 with the forked head 40 of a slide 41 which is mounted to move back and forth on ways 42 attached to the side of the frame. Pivoted to this slide is a yoke 44 which has a roller 45 that is engaged by a cam 46 on the cam shaft 18. A link 47 connects the slide 41 with a lever 48 that is pivoted to a bracket 49 attached to the frame, which lever has a roller 50 engaged by a cam 51 on the cam shaft 18. When the first mentioned cam 46 engages the roller carried by the yoke the slide is forced forward and the toggle links expanded so as to cause the outer ends of the levers to close and with great power force the serrating teeth into the edges of the bar. As the second mentioned cam 51 engages the roller carried by the lever, the slide is drawn back and the toggle links collapse causing the serrating teeth to open from the bar.

The pivoted yoke 44 is also connected with the slide by toggle links 52, the joint 53 of which is connected by a link 54 with an angle lever 55 that may be utilized to swing the yoke up so that its roller will not be engaged by the cam and the slide forced forward. By this means the serrating teeth may be manually thrown into or out of operative action while the machine is running.

The flattening punch and anvil are shown in detail in Figs. 9, 10 and 11. In the machine illustrated a flattening punch 56, a perforating punch 57, and a blank severing punch 58 are mounted on the front of a punch block 59 that is clamped in a recess in a slide 60 which is movable forward and backward horizontally on ways 61 that extend along the inner faces of the sides 65 of the frame. Extending rearward from this slide is a yoke 62 and movable vertically in the yoke is a block 63 that surrounds an eccentric 64 which is fastened to the cam shaft 18. The rotation of this eccentric reciprocates the slide and carries the flattening punch, perforating punch and severing punch forward and backward.

Opposite the flattening punch 56 is an anvil 66 with which this punch cooperates in flattening any burr or swelling of stock that is raised by the action of the serrating teeth. This anvil is substantially semi-circular and is movably held by a plate 67 in a correspondingly shaped recess in a bed 68 that is secured in the inside of the front 69 of the frame.

Below the flattening punch 56 and extending slightly further forward is a plunger 70 that is designed to, after the bar has been fed, engage the anvil below its axis and turn and hold it so that its upper portion bears against and supports the front face of the bar of stock when the back face is hit by the flattening punch. The upper edge of this anvil is normally kept out of the path of the bar by a leaf spring 71 that is fastened to the bed 68 and presses against the upper corner of the anvil plate, which spring yields when the plunger strikes the lower portion of the plate and allows the upper portion of the plate to back up the bar and resist the blow incident to the strike of the flattening punch.

The sinking punch and its operating mechanism are illustrated in detail in Figs. 12, 13 and 14. In the machine shown the sinking punch 72 is forced into the bar from the front. This punch has a conical tip 73 that is designed to enter the bar and by compression and without removing any metal forms a socket in the center of each blank section as presented. The punch also has a flat surface 74 that engages the front side face of the bar to further flatten it, and two lips 75 that extend over the top and bottom edges of the bar to prevent its distortion edgewise, and cause the bar to elongate longitudinally when the punch sinks the hole and flattens the face. Opposite the punch is a hardened anvil plate 76 set in a block 77 that is held by a clamp 78, Figs. 1, 10, to the face of the bed 68 which is mounted in the inside of the front 69 of the frame.

The sinking punch 72 is at the end of a shaft 79 which extends through the front of the frame and is connected by a link 80 with a lever 81 that is pivoted by a stud 82 to a bracket 83 attached to one side of the frame. This lever extends across the front of the frame and its swinging end is connected by a sectional link 84 with the upper end of a rocker 85 which is pivoted in a bracket 86 that is attached to the side of the frame, Fig. 1. At its upper end this rocker has a roller 87 which is engaged by a cam 88 on the cam shaft 18, and at its lower end the rocker has a roller 89 which is engaged by a cam 90 on the cam shaft, the former cam acting to withdraw the sinking punch and the latter cam acting to force the sinking punch into the bar at the desired times. The sections of the link 84 are joined by a well-known type of coupling 91 that should undue resistance be offered to the operating movements of the sinking punch breaks, the screw 92 smashing the plate 93 and so disconnecting the coupling parts that the cams can continue to rotate without transmitting movements to the sinking punch lever.

The perforating punch 57, as shown in Fig. 9, is held by suitable means on the front face of the punch block 59 that is mounted in the slide 60 which is reciprocated by the eccentric 64, Fig. 10. This punch is so located that it moves from the rear and passes through the bar of stock and completes the hole started in the opposite face by the sinking punch 72. Set in the bed opposite the perforating punch is a hardened backing bush 94 with an opening 95 through which the small amount of metal removed by the perforating punch escapes from the machine. The perforating punch on entering the stock passes through and is guided by an opening 96 in the block 77 that is clamped to the bed 68, Fig. 9.

The severing punch 58 is fastened in the punch block 59 on the eccentric operated slide 60 and is moved from the rear toward the bar with the flattening punch and the perforating punch, Fig. 9. The severing punch is preferably hexagonal in cross section and has a pilot tip 97 which enters the hole that has been punched and ensures the centering of the stock. In the bed 68 opposite the severing punch is a severing die 98. The severing punch and die cut the perforated and partly shaped end blank from the bar, and the continued movement of this punch forces the severed piece into the trimming die 99 which gives the final shape to the blank. The blanks are pushed through the trimming die by the succeeding blanks and are pushed out of the machine through a passage 100 in the front of the frame, Fig. 9.

Adjustable guides are provided for supporting the bar adjacent to the locality of the sinking punch and perforating punch, Fig. 15. These guides comprise a pair of jaws 101, one designed to engage the top edge and the other the bottom edge of the bar, and they are at the ends of angle levers 102 that are pivoted by studs 103 to a bracket 104 attached to the side 65 of the frame, Fig. 16. The upper end of the angle lever carrying the lower jaw is engaged by a screw 105 that extends through an arm 106 of the bracket, so that the under jaw may be adjusted to the position required by the width of the bar. The upper end of the angle lever which carries the upper jaw is also capable of adjustment by means of the screw 107 which passes through the bracket arm, Fig. 16. Between a nut 108 that is turned upon this screw and a collar 109 with a wedge face at the upper end of the lever is a collar 110 that has a wedge face and an operating handle 111, Figs. 15, 16. With this handle turned to one position the wedge surfaces are disengaged and the lever released so that this jaw may be opened to permit the easy insertion between or removal of a bar from between the jaws. When the handle is turned to the position illustrated the wedges engage and hold the lever in its closed position. These jaws guide the upper and lower edges of the bar as it is fed and retain it so that the sinking punch and the perforating punch will enter central, vertically, in each blank section as it is presented for the action of these punches.

Means which cooperate with the feed mechanism are provided for locating the bar lengthwise so that the tools will perform their several functions accurately. These means, shown in Figs. 15, 16 and 17, comprise angular fingers 112 which are closed into serrations in the upper and lower edges of the bar between the locality of the perforating punch 57 and the shearing punch 58. These fingers are fastened to the ends of levers 113 which are pivoted by studs 114 to the forked head 115 of a tubular shaft 116 that is movably located in an opening in the side of the frame. On the outer end of the tubular shaft is a spool 117 that is engaged by studs 118 in the forked end of an angle lever 119 that is pivoted by a stud 120 to a bracket 121 fastened to the frame. The upper end of this lever has a roller 122 which is engaged by a cam 123 on a shaft 124 that extends forward and backward on the top of the frame. This roller is held in engagement with the cam by spring 142, Fig. 16. Cam 123 is designed to, at the proper times, cause the tubular shaft and the levers carrying the locating fingers to move back and forth. An adjustable inclined back plate 125 that has a screw stem 126 extending through an arm 127 of the bracket provides means for accurately determining the exact amount of backward movement of the head carrying the levers and locating fingers, Figs. 15, 16.

Extending through the tubular shaft 116 is a rod 128 with a wedge shaped head 129 that is designed to engage with rollers 130 located in the ends of the levers 113 which carry the locating fingers 112, Fig. 16. When this rod is forced forward the wedge 129 causes the levers to close the fingers into serrations in the edges of the bar. When the wedge is withdrawn the jaws are free to be opened by a spring 143. A spring 131 is arranged on the rod in the tubular shaft in such manner as to normally force the wedge forward and cause the jaws to close as the shaft is moved forward. The wedge shaped head of the rod 128 is withdrawn to allow the jaws to open, by means of an angle lever 132 that is pivated on a stud 133 carried by the bracket, and has a forked end arranged to engage a collar 134 on the end of the rod. The other end of this lever bears a roller 135 that is engaged by a cam 136 on the shaft 124 that extends forward and back on the top of the machine. This shaft which carries these cams has a bevel gear 137 that meshes with a bevel gear 138 on a shaft 139 which extends across the frame and is provided with a spur gear 140 in mesh with a spur gear 141 on the main cam shaft 18 below. The cam shaft has a driving pulley 143 which may be connected therewith by any well known type of clutch.

The control cams are so shaped and timed that when the machine is in operation the feed jaws are closed and moved to advance the stock a step and then subsequently opened and returned. While the feed jaws are returning the serrating teeth are closed to indent the edges of the stock and as the feed jaws at this time are open they do not interfere with the elongation of the stock toward them as the serrating teeth enter and expand it. The locating fingers which are open when the stock is fed but are immediately closed and remain closed while the serrating tools are acting, are pulled back at this time a distance equal to the elongation of the stock toward them resulting from the action of the serrating teeth. During the last part of the feed of the stock the eccentric begins to advance the slide with the severing punch, perforating punch and flattening punch. After the feeding is completed the severing punch, that projects further than the other punches carried by the slide, removes the end blank from the bar of stock and forces it into the trimming die. As soon as a blank is cut off the feed cam draws the bar of stock back a little distance so that the severing punch, which at this time extends beyond the end of the bar, will not interfere with the expansion of the stock resulting from the actions of the other tools. During this action the locating fingers are closed on the stock and are by their cams allowed to move back with it. Following this withdrawal of the stock the sinking punch is forced into it by its cam. While the sinking punch is entering and expanding the stock the feed jaws draw the stock back slightly and the locating fingers are drawn forward a little to compensate for the elongation of the stock resulting from the action of the sinking punch. As the sinking punch is withdrawn from the stock the perforating punch enters the stock, not of course at the same locality but at a locality that previously has had a hole sunk on the opposite side. As the perforating punch enters, the feed cam causes the feed to pull back the stock and the finger cam causes the fingers to pull the stock forward to compensate for the elongation of the stock resulting from this operation. As the slide 59 carrying the flattening punch 56, perforating punch 57, and severing punch 58 approaches the end of its forward movement the flattening punch engages the stock and performs its function. Following this the feed jaws are opened and returned and the serrating teeth are again caused to act and be followed by the other tools.

The locations of these several operations in the machine illustrated are indicated in Fig. 2 which shows the condition of a bar of stock as it is passing through the machine. At the plane *a* the serrating tools notch the edges of the bar; at the plane *b* the flattening punch smooths whatever burr is raised by the serrating tools; at the plane *c* the sinking punch enters at one side; at the plane *d* the perforating punch completes the hole from the other side; and at the plane *e* the end blank is severed from the bar of stock and forced into the trimming die.

By this method two opposite flat faces of the blanks are formed by the edges of the bar, and two adjacent angular faces are approximately formed by the angular serrating teeth. This allows the use of a relatively narrow bar of stock, and as the angles formed by the serrating teeth between the blanks are acute, rather than obtuse, the serrating teeth are driven in with a comparatively small expenditure of power and with a maximum amount of wedging force, which effects the desired elongation of the bar.

The only waste of stock is that slight amount which is removed by the perforating punch, and the final trimming that is done by the severing punch and die as a blank is cut from the end of the bar of stock. Eliminating all cutting in initially shaping and perforating the blanks saves metal and tool wear, and also condenses and hardens the exterior faces of the blanks and the walls of the perforations which are subsequently threaded.

The invention claimed is:—

1. In a machine of the character described, feed jaws, mechanism for opening and closing said jaws, mechanism for reciprocating said jaws, and mechanism for piercing the stock, said feed jaws being closed on the stock and retracted equal to the lengthwise expansion of the stock while the stock is being pierced.

2. In a machine of the character described, feed jaws, mechanism for opening and closing said jaws, mechanism for reciprocating said jaws, and mechanism for sinking sockets in the face of the stock, said feed jaws being closed on the stock and retracted to compensate for the lengthwise expansion of the stock while the sockets are being sunk.

3. In a machine of the character described, feed jaws, mechanism for opening and closing said jaws, mechanism for reciprocating said jaws, teeth for serrating the edges of stock fed by said jaws, a punch for severing blanks from the end of the stock fed by said jaws, locating fingers adapted to engage said serrations, mechanism for opening said fingers, mechanism for closing said fingers while the severing punch is operating, and means permitting the said fingers while closed to be drawn back with the feed jaws immediately following the severing of a blank.

4. In a machine of the character described, feed jaws, mechanism for opening and closing said jaws, mechanism for reciprocating said jaws, teeth for serrating the edges of stock fed by said jaws, a punch for sinking sockets in the face of the stock between the serrations, locating fingers adapted to engage said serrations, mechanism for opening said locating fingers, mechanism for closing said locating fingers into the serrations in the stock, and mechanism for drawing said fingers forward equal to the longitudinal expansion of the metal during the action of said sinking punch.

5. In a machine of the character described, feed jaws, mechanism for opening and closing said jaws, mechanism for reciprocating said jaws, teeth for serrating the edges of stock fed by said jaws, a punch for perforating said stock, locating fingers adapted to engage the said serrations, mechanism for opening said fingers, mechanism for closing said fingers, and mechanism for drawing said fingers forward during the operation of the perforating punch to compensate for the longitudinal expansion of the metal.

6. In a machine of the character described, feed jaws, mechanism for opening and closing said jaws, mechanism for reciprocating said jaws, teeth for serrating the edges of stock fed by said jaws, locating fingers adapted to engage said serrations, mechanism for opening and closing said fingers and mechanism for drawing said fingers forward equal to the longitudinal expansion of the metal while the serrating teeth are acting.

7. In a machine of the character described, feed jaws, mechanism for opening and closing and reciprocating said jaws, teeth for serrating the edges of stock fed by said jaws, mechanism for opening and closing said teeth, a flattening punch, a slide carrying said flattening punch, mechanism for reciprocating the slide, an anvil arranged to back the stock opposite said flattening punch, and a plunger mounted on and movable with the slide and adapted to engage said anvil and retain it while said punch is flattening the stock.

8. In a machine of the character described, mechanism for feeding stock, mechanism for serrating the edges of the stock, a punch for flattening the serrated sections of the stock, a movable anvil for backing the stock while said punch is operating, and a plunger movable with said punch and adapted to move said anvil into and retain it in operative position while the punch is operating.

9. In a machine of the character described, mechanism for feeding stock, mechanism for serrating the edges of the stock, mechanism for perforating the stock, mechanism for severing a blank from the end of the stock, and fingers adapted to engage the serrations and locate the stock, said fingers being adapted to open and close and also to reciprocate in the direction of the feed of the stock.

10. In a machine of the character described, mechanism for feeding stock, mechanism for serrating the edges of the stock, fingers adapted to engage serrations in the stock, said fingers being mounted on levers, a wedge adapted to engage the levers and close said fingers, and means for reciprocating said fingers in the line of feed of the stock.

11. In a machine of the character described, means for feeding a bar of stock, teeth for serrating the edges of the fed stock, levers carrying said serrating teeth, and mechanism for opening and closing said levers, said mechanism comprising a slide, toggle levers between the teeth-carrying levers and the slide, a cam for forcing said slide forward, and a cam for drawing said slide backward.

12. In a machine of the character described, means for feeding a bar of stock, teeth for serrating the edges of the fed stock, levers carrying said serrating teeth, a slide, toggle levers between the teeth-carrying levers and the slide, a cam for forcing said slide forward and a cam for drawing said slide backward, a pivoted yoke between said slide and the first mentioned cam, and a toggle for swinging said yoke into and out of operative position between the slide and cam.

13. A machine for forming nut blanks from a cold bar of stock which comprises mechanism for gripping and feeding the stock with a step by step movement, mechanism for compressing and forming V-shaped serrations in the edges of the stock at intervals after each feed, mechanism for flattening the faces of the serrated stock bulged by the action of the serrating mechanism, mechanism for sinking sockets in the face of the stock intermediate the serrations and flattening the face of the stock about the sockets, after each feed, mechanism for piercing the stock at the localities of said sockets, after each feed, and mechanism for severing pierced and flattened blanks from the end of the stock after each feed.

14. A machine for forming nut blanks from a cold bar of stock which comprises mechanism for gripping and feeding the stock with a step by step movement, mechanism for compressing and serrating the edges of the stock at intervals after each feed, mechanism for sinking sockets in the face of the stock intermediate the serrations after each feed, mechanism for piercing the stock at the localities of said sockets after each feed, and mechanism for severing pierced blanks from the end of the stock, said feed mechanism gripping and retracting the stock as the sockets are being sunk a distance equal to the longitudinal extension of the metal due to the sinking of the sockets.

15. A machine for forming nut blanks from a cold bar of stock which comprises mechanism for gripping and feeding the stock with a step by step movement, mechanism for compressing and serrating the edges of the stock at intervals after each feed, mechanism for sinking sockets in a side face of the stock intermediate the serrations after each feed, mechanism for piercing the stock at the localities of said sockets after each feed, and mechanism for severing pierced blanks from the end of the stock after each feed, said feed mechanism gripping and retracting the stock while the stock is being pierced a distance equal to the longitudinal extension of the metal due to the piercing operation.

16. A machine for forming nut blanks from a cold bar of stock which comprises mechanism for gripping and feeding the stock with a step by step movement, mechanism for compressing and serrating the edges of the stock at intervals after each feed, mechanism for sinking sockets in a side face of the stock intermediate the serrations after each feed, mechanism for piercing the stock at the localities of said sockets after each feed, and mechanism for severing pierced blanks from the end of the stock after each feed, said feed mechanism gripping and retracting the stock while a socket is being sunk and while a hole is being pierced a distance equal to the longitudinal extension of the stock while the socket is being sunk and the hole pierced.

17. A machine for forming nut blanks from a cold bar of stock which comprises jaws for gripping and feeding the stock with a step by step movement, teeth for serrating opposite edges of the stock at intervals, after each feed, a punch for transversely piercing the stock intermediate the serrations, after each feed, and locating fingers adapted to engage serrations formed by said teeth in the stock and pull the stock forward as the piercing punch operates, equal to the elongations of the stock due to the operation of the piercing punch, so that the serrating operations will be effected in the correct localities.

18. A machine for forming nut blanks from a cold bar of stock which comprises jaws for gripping and feeding the stock with a step by step movement, teeth for serrating opposite edges of the stock at intervals after each feed, a punch for sinking sockets in one side face of the stock intermediate the serrations after each feed, and locating fingers adapted to engage serrations formed by said teeth in the stock and pull the stock forward as the sinking punch operates to compensate for the elongation of the stock due to the sinking of the sockets.

19. A machine for forming nut blanks from a cold bar of stock which comprises jaws for gripping and feeding the stock with a step by step movement, teeth for serrating opposite edges of the stock at intervals after each feed, a punch for sinking sockets in one side face of the stock intermediate the serrations after each feed, a punch operating on the other side of the stock from the sinking punch for transversely piercing the stock at the localities of said sockets following the withdrawal of the sinking punch, and locating fingers adapted to engage serrations formed by said teeth in the stock and pull the stock forward as the sinking punch operates also as the piercing punch operates, a distance equal to the elongation of the stock due to the actions of the punches, whereby the several tools will act upon the stock in the correct localities.

20. A machine for forming nut blanks from a cold bar of stock which comprises jaws for gripping and feeding the stock with a step by step movement, oscillatory teeth for compressing and serrating opposite edges of the stock at intervals after each feed, a punch for sinking sockets in one side face of the stock intermediate the serrations after each feed, a punch for transversely piercing the stock at the localities of said sockets following the withdrawal of the sinking punch, mechanism for severing pierced blanks from the end of the stock, and locating fingers adapted to engage serrations in the stock and pull the stock forward as the piercing punch operates also as the sinking punch operates, said feed mechanism having means whereby the stock is gripped and retracted a short distance after each blank has been severed, also while a socket is being sunk and while a hole is being pierced, in order that the several tools will operate on the stock in the correct localities.

21. A machine for forming hexagonal nut blanks from a cold bar of stock which comprises oscillatory and reciprocatory jaws for gripping and feeding the stock with a step by step movement, oscillatory teeth for compressing and serrating the edges of the stock at intervals after each feed, mechanism for oscillating said teeth, a punch for flattening the faces of the serrated stock after each feed of the stock, a punch for piercing the stock after each flattening, a punch for cutting off the pierced blanks through the serrated sections at the end of the stock, a slide carrying said punches, and an eccentric for reciprocating said slide.

22. A machine for forming nut blanks from a cold bar of stock which comprises jaws for intermittently gripping and feeding the stock forward, oscillatory teeth for serrating the edges of the stock at intervals after each feed and when the grip of said jaws is released from the stock, mechanism for oscillating said teeth, a punch advanced from one side for sinking sockets in the face of the stock after each feed of the stock, a punch advanced from the opposite side for piercing the stock at the localities of said sockets after each feed of the stock, a punch for severing pierced blanks from the end of the stock, mechanism for actuating said punches while the feed jaws grip the stock, and mechanism for slightly retracting the feed mechanism as the sinking punch and perforating punch operate.

23. A machine for forming nut blanks from a cold bar of stock which comprises jaws for intermittently gripping and feeding the stock, oscillatory teeth for compressing and serrating the edges of the stock at intervals after each feed of the stock, levers carrying said teeth, a cam operated toggle mechanism for oscillating said levers, a punch advanced from one side for sinking sockets in a side face of the stock intermediate the serrations, a punch advanced from the opposite side for piercing the stock at the localities of said sockets, a punch for severing pierced blanks from the end of the stock, a slide carrying said piercing punch and severing punch, mechanism for actuating said slide after each feed, and mechanism for retracting the feed jaws before they release their grip on the stock.

24. A machine for forming nut blanks from a cold bar of stock which comprises jaws for gripping and feeding the stock with a step by step movement, teeth for compressing and serrating the edges of the stock at intervals after each feed, a punch for flattening the stock about the edges of the serrations after each feed of the stock, a punch for sinking sockets in a side face of the stock intermediate the serrations after each feed, a punch for piercing the stock at the localities of said sockets after each feed, a punch for cutting off pierced blanks across the serrations at the end of the stock, a slide carrying said sinking punch on one side of the stock, a slide carrying said flattening, piercing and severing punches on the other side of the stock, and means for coincidently actuating said slides.

WILLIAM L. WARD.